United States Patent
Chico et al.

(10) Patent No.: US 9,815,447 B2
(45) Date of Patent: Nov. 14, 2017

(54) METHOD FOR MONITORING AT LEAST TWO ELECTROMECHANICAL BRAKING ACTUATORS

(71) Applicant: MESSIER-BUGATTI-DOWTY, Velizy-Villacoublay (FR)

(72) Inventors: Philippe Chico, Velizy-Villacoublay (FR); Frédéric Ragot, Velizy-Villacoublay (FR); François Bonigen, Velizy-Villacoublay (FR); Thomas Lepage, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/605,488

(22) Filed: Jan. 26, 2015

(65) Prior Publication Data
US 2015/0217748 A1     Aug. 6, 2015

(30) Foreign Application Priority Data
Jan. 31, 2014   (FR) ...................... 14 50788

(51) Int. Cl.
*B60T 17/22*   (2006.01)
*B64C 25/44*   (2006.01)
(Continued)

(52) U.S. Cl.
CPC .......... *B60T 17/221* (2013.01); *B60T 8/1703* (2013.01); *B60T 8/885* (2013.01); *B60T 17/22* (2013.01);
(Continued)

(58) Field of Classification Search
CPC ... B60T 2270/406; B60T 17/22; B64F 5/0045
See application file for complete search history.

(56) References Cited

U.S. PATENT DOCUMENTS 5,102,203 A * 4/1992 Tierney ................... B60T 8/175
                                                    180/197
5,883,355 A * 3/1999 Kaneshima ........... B23K 11/311
                                                    219/86.51
(Continued)

FOREIGN PATENT DOCUMENTS

DE   102 60 723 A1   3/2004
GB     2470251 A    11/2010

OTHER PUBLICATIONS

French Search Report for FR1450788 dated Sep. 12, 2014.

*Primary Examiner* — Thomas Ingram
(74) *Attorney, Agent, or Firm* — Sughrue Mion, PLLC

(57) ABSTRACT

A method for monitoring at least two aircraft wheel electromechanical braking actuators. For each electromechanical actuator, the method includes first determining a current value representative of the power supply current of the electromechanical actuator and determining a reference current value estimated from the power supply currents of at least one other electromechanical actuator. Then, the representative current value and the reference current value are compared. Any abnormal operation of the electromechanical actuator is detected when the difference between the representative current value and the reference current value is above a predetermined threshold.

7 Claims, 2 Drawing Sheets

(51) Int. Cl.
 *B60T 8/17* (2006.01)
 *B60T 8/88* (2006.01)

(52) U.S. Cl.
 CPC ......... *B64C 25/44* (2013.01); *B60T 2270/406* (2013.01)

(56) References Cited

U.S. PATENT DOCUMENTS

| | | | |
|---|---|---|---|
| 6,795,761 B1* | 9/2004 | Lee | B60T 8/1755 180/6.2 |
| 2010/0222980 A1* | 9/2010 | Berr | B60T 8/885 701/77 |
| 2010/0292889 A1* | 11/2010 | Cahill | B60T 8/1703 701/29.1 |
| 2011/0133676 A1* | 6/2011 | Ikushima | F03G 7/005 318/116 |
| 2014/0151164 A1* | 6/2014 | Yokoyama | B60T 8/885 188/72.3 |

\* cited by examiner

METHOD FOR MONITORING AT LEAST TWO ELECTROMECHANICAL BRAKING ACTUATORS

This application claims priority from French 14 50788 filed Jan. 31, 2014, the contents of all of which are incorporated herein by reference in their entirety.

The invention relates to a monitoring method consisting in comparing a current value representative of the power supply current of an electromechanical braking actuator with a reference current value estimated from power supply currents of other actuators.

BACKGROUND OF THE INVENTION

An electromechanical aircraft brake generally comprises at least one electromechanical actuator conventionally comprising a thruster and an electric motor suitable for displacing the thruster facing friction members of the brake (a stack of carbon disks for example), so as to exert, on the friction members, a braking force tending to slow down the aircraft. To produce the park braking function, that is to say the immobilization of the aircraft without the pilot having to continually press on the brake pedals, the electromechanical actuator is provided with a blocking member which makes it possible to selectively immobilize the thruster of the electromechanical actuator in position.

Such an electromechanical actuator is electrically powered and controlled by external or internal control means which receive a braking setpoint and determine a braking force to be applied to the friction members.

This electromechanical actuator has to be associated with effective monitoring means intended to regularly check that the electromechanical actuator is operating correctly. It is in fact vital to the safety of the aircraft to ensure, on the one hand, that the controlled braking force is correctly applied, and, on the other hand, that a braking force is not applied inadvertently. It is also vital to know the real state of the blocking member of the electromechanical actuator and to detect any malfunctioning of this blocking member, for example an accidental locking thereof.

Implementing the existing monitoring means often results in a not inconsiderable increase in the weight of the electromechanical actuator or in the addition of additional sensors associated with the electromechanical actuator. Furthermore, the existing monitoring means are often sensitive to environmental disturbances (thermal, electromechanical, etc.) to which the electromechanical actuators are subject.

OBJECT OF THE INVENTION

The subject of the invention is a method for monitoring electromechanical braking actuators that is highly insensitive to the environmental disturbances and that can be implemented without any weight increase.

SUMMARY OF THE INVENTION

The invention will be better understood in light of the following description with reference to the figures of the attached drawings in which:

FIG. 1 schematically represents an architecture of a braking system of an aircraft in which the monitoring method of the invention is implemented;

FIG. 2 is a functional diagram representing the monitoring method of the invention.

BRIEF DESCRIPTION OF THE DRAWINGS

In order to achieve this aim, there is proposed a method for monitoring at least two aircraft wheel electromechanical braking actuators, each electromechanical actuator being powered by means of a power supply current to selectively apply a pressing force to friction members. The monitoring method comprises the step of activating the electromechanical actuators, and, for each electromechanical actuator, the steps of:

determining a current value representative of the power supply current of the electromechanical actuator;

determining a reference current value estimated from the power supply currents of at least one other electromechanical actuator;

comparing the representative current value and the reference current value;

detecting an abnormal operation of the electromechanical actuator when the difference between the representative current value and the reference current value is above a predetermined threshold.

Thus, the abnormal operation of the electromechanical actuator is detected by determination followed by analysis of the current value representative of its power supply current and of the reference current value, said determinations and analysis being able to be performed by pre-existing means (current sensors, etc.). Implementing the monitoring method of the invention does not therefore necessitate the use of additional equipment and can therefore be achieved with no weight increase.

If an abnormal operation of the electromechanical actuator is detected, the braking system is thus capable of warning the pilot of the aircraft and/or of generating a failure message. The braking system can then be reconfigured to try to restore the electromechanical actuator to normal operating conditions.

Furthermore, since the detection of the abnormal operation of the actuators is based on the analysis of the difference between the representative current value and the reference current value, the influence on the detection of environmental disturbances is greatly reduced by comparing power supply currents of actuator motors which are subject in the same way or almost in the same way to these environmental disturbances, notably to the temperature (actuators of one and the same brake or of brakes of two nearby wheels, or actuators powered by one and the same controller, etc.).

DETAILED DESCRIPTION OF THE INVENTION

Figure 1:
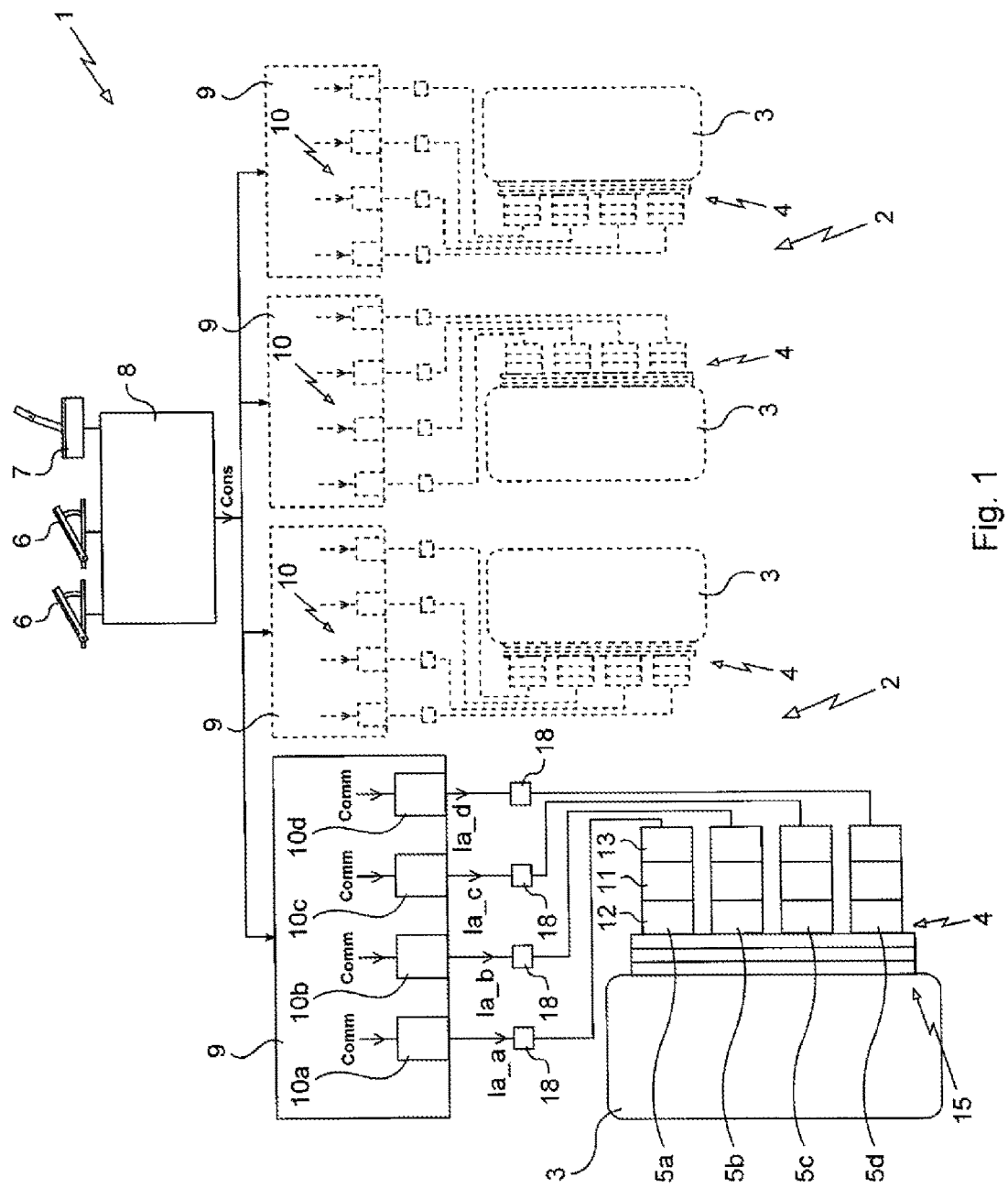

Referring to FIG. 1, the invention is here implemented on an aircraft 1 comprising two main landing gears 2 each bearing two wheels 3 equipped with electromechanical brakes 4. Each electromechanical brake 4 comprises four electromechanical braking actuators 5a, 5b, 5c, 5d.

The brakes 4 of the wheels 3 of the aircraft 1 are actuated by a braking system which, in addition to the electromechanical actuators 5, comprises two brake pedals 6, a park braking lever 7, a single braking computer 8 and four braking controllers 9. Each braking controller 9 comprises four power modules 10a, 10b, 10c, 10d each connected to one electromechanical actuator 5a, 5b, 5c, 5d of the brake 4 of one and the same wheel 3.

Each electromechanical actuator 5 comprises an electric motor 11, a thruster 12 driven by the electric motor 11 and a blocking member 13 suitable for blocking the thruster 12 in position.

The thruster 12 is actuated by the electric motor to selectively apply a controlled braking force to associated friction members of the brake 4, in this case to a stack of disks 15. This controlled braking force induces friction forces between rotors and stators of the stack of disks 15 and contributes to slowing down the rotation of the associated wheel 3 and therefore to the braking of the aircraft 1.

Here, the blocking member 13 is a power-off brake which, when powered, leaves the thruster 12 of the electromechanical actuator 5 free to be displaced under the action of the electric motor 11 but, when it is no longer powered, blocks the thruster 12 in position.

The brakes 4 of the wheels 3 of the aircraft 1 can therefore be controlled to brake the aircraft 1 when the aircraft 1 is on the ground, and are adapted to apply a controlled braking mode and a park braking mode.

The braking of the aircraft 1 in controlled mode is activated either by the action of a pilot of the aircraft 1 on the brake pedals 6, or in response to a selection by the pilot of a determined deceleration level ("autobrake" function).

The braking computer 8 then generates a braking setpoint Cons transmitted to each braking controller 9 and transformed into a braking force command Comm which is in turn transmitted to the power modules 10 of the braking controllers 9. Each power module 10a, 10b, 10c, 10d supplies, as a function of this braking command Comm, a power supply current Ia_a, Ia_b, Ia_c, Ia_d to the electric motor 11 of the electromechanical actuator 5a, 5b, 5c, 5d to which it is connected, such that the brakes 4 generate a braking force making it possible to brake and slow down the aircraft 1.

The braking of the aircraft 1 in park mode is activated by the action of the pilot on the park braking lever 7. In the park braking mode, the thruster 12 is controlled to exert, on the stack of disks 15, a park force, then is blocked in position by the blocking member 13.

In the embodiment described here, the aim of the monitoring method of the invention is to detect an accidental locking of a blocking member 13 of an electromechanical actuator 5 of the brake 4 of a wheel 3 by comparing the power supply current Ia of the electric motor 11 of this electromechanical actuator 5 with the power supply currents Ia of the other electric motors 11 of the other electromechanical actuators 5 of the same wheel 3.

The method of the invention will therefore be described with reference to a single wheel 3 equipped with a brake 4 comprising four electromechanical actuators 5a, 5b, 5c, 5d, this description being equally applicable to the other wheels 3 of the aircraft 1.

Figure 2:
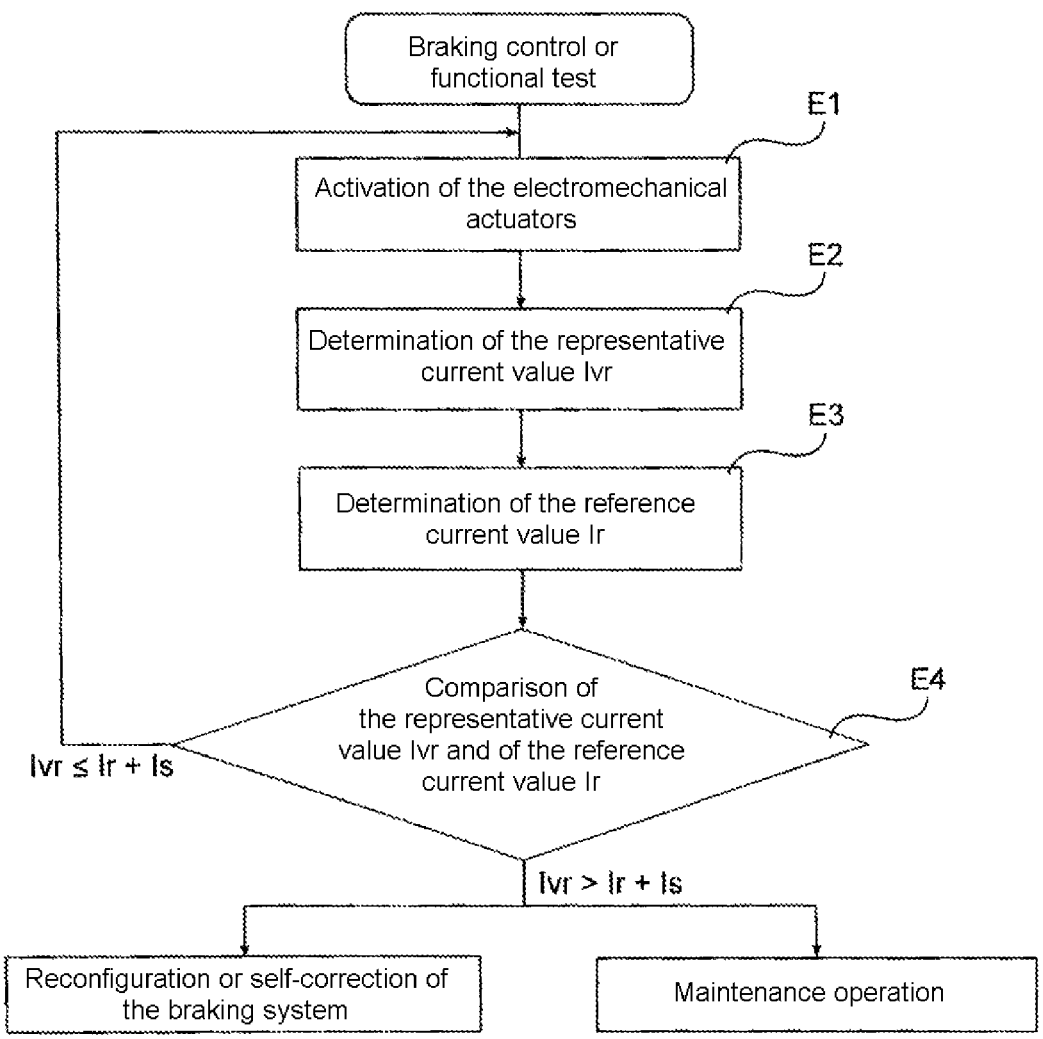

Referring to FIG. 2, the monitoring method of the invention can be implemented following a braking control or during a functional test. The monitoring method comprises, first of all, a step E1 during which the electromechanical actuators 5 of the wheel 3 are activated.

Then, the monitoring method of the invention comprises a certain number of steps performed for each electromechanical actuator 5a, 5b, 5c, 5d one after the other, and intended to check that the blocking member 13 of said electromechanical actuator 5a, 5b, 5c, 5d is not abnormally locked.

Thus, for the electromechanical actuator 5a, the monitoring method of the invention comprises a step E2 consisting in determining a current value Ivr_a representative of the power supply current Ia_a of the electric motor 11 of the electromechanical actuator 5a.

This representative value Ivr_a is, here, an absolute value of an estimation Ie_a of the power supply current Ia_a of the electric motor 11 of the electromechanical actuator 5a.

The estimation Ie_a of the power supply current Ia_a of the electric motor 11 of the electromechanical actuator 5a is, here, an average value over a certain period T of the power supply current Ia_a measured by a current sensor 18 (visible in FIG. 1) connected to the motor 11 of the electromechanical actuator 5a. Each motor 11 of each electromechanical actuator 5 of each brake 4 of each wheel 3 is thus connected to a current sensor 18.

The method of the invention then comprises a step E3 consisting in determining a reference current value Ir_a estimated from the power supply currents Ia of at least one other electric motor 11 of another electromechanical actuator 5. In this case, the reference current value Ir_a is, here, estimated from the power supply currents Ia_b, Ia_c, Ia_d of the motors 11 of the electromechanical actuators 5b, 5c, 5d.

This reference current value Ir_a is, here, an average of absolute values of estimations Ie_b, Ie_c, Ie_d of the power supply currents of the motors 11 of the electromechanical actuators 5b, 5c, 5d. The estimations Ie_b, Ie_c, Ie_d are, here, average values over the certain period T of the power supply currents Ia_b, Ia_c, Ia_d measured by the associated current sensors 18.

The method of the invention then comprises a step E4 during which the representative current value Ivr_a and the reference current value Ir_a, that is to say, in this case, the absolute value of the estimation Ie_a and the average of the absolute values of the estimations Ie_b, Ie_c, Ie_d, are compared. If the difference between the representative current value Ivr_a and the reference current value Ir_a is above a predetermined current threshold Is, then an accidental locking of the blocking member 13 of the electromechanical actuator 5a is detected. In this case, the electromechanical actuator 5a is identified and its abnormal operation is signalled. An action of reconfiguration of the braking system or a corrective action can be controlled, to try to correct the accidental locking of the blocking member 12 and to restore the electromechanical actuator 5a to normal operating conditions. If the reconfiguration action or the corrective action does not make it possible to restore the electromechanical actuator 5a to the normal operating conditions, the electromechanical actuator 5a is deactivated, a failure message is sent and a maintenance operation is ordered, said maintenance operation consisting in directly performing a test on the electromechanical actuator 5a or in replacing the latter. If the difference between the representative current value Ivr_a and the reference current value Ir_a is below or equal to the predetermined current threshold Is, a normal operation of the electromechanical actuator 5a is detected.

The steps which have just been described are then performed for each other electromechanical actuator 5b, 5c, 5d.

It will be noted that, in the case of the monitoring method described here, where the abnormal operation of the electromechanical actuator 5 detected is an accidental locking of the blocking member 12 of said electromechanical actuator 5, it is preferable, for each electromechanical actuator 5 monitored, to define the representative current value Ivr and the reference current value Ir from power supply currents Ia measured during power-off operating phases of the electromechanical actuator 5. A power-off operating phase corresponds to a movement of convergence or a movement of divergence of the thruster 12 towards or from the stack of disks 15, during which the thruster 12 is displaced towards the stack of disks 15 or moves away from the stack of disks 15 without being in contact therewith. During such convergence or divergence movements, the power supply current Ia of the electric motor 11 of the electromechanical actuator 5 concerned is substantially constant and low, the speed of the thruster 12 is stable, substantially constant, and the position of the thruster 12 varies linearly.

The invention is not limited to the particular implementation which has just been described, but, quite the contrary, covers any variant falling within the framework of the invention as defined by the claims.

Although the invention has been described in an aircraft comprising a braking system that has a certain architecture, the invention can obviously be implemented in an aircraft comprising a braking system of different design.

Although, in the monitoring method described here, a power-off brake as blocking member of the electromechanical actuator has been taken as the example, the invention can be applied to any type of blocking member.

Although, in the monitoring method described here, a power supply current of a motor of an electromechanical actuator is compared to the power supply currents of the motors of the other electromechanical actuators of the same wheel or to the average of the power supply currents of all the actuators of the wheel, it is possible to compare a power supply current of a motor of an actuator with that of a motor of an actuator of another wheel. The monitoring method is thus, for example, applicable to a braking system of any vehicle comprising two wheels each equipped with a brake comprising a single electromechanical actuator.

Although it has been indicated that the values of estimations Ie_a, Ie_b, Ie_c, Ie_d of the power supply currents of the motors are average values over a certain period T, these estimation values can also be instantaneous values of the power supply currents or any other type of value making it possible to estimate these power supply currents.

Although it has been indicated here that the abnormal operation of the electromechanical actuator detected is an accidental locking of the blocking member, the abnormal operation detected may be different (accidental blocking of the thruster, seizing or internal wear of the actuator, etc.).

The invention claimed is:

1. A method for monitoring and restoring or disabling at least three aircraft wheel electromechanical braking actuators (5), each electromechanical actuator (5) being powered by a power supply providing a current (Ia) under control of a braking controller (9) to selectively apply a braking force to friction members (15), the monitoring and restoring or disabling method comprising:
    activating the electromechanical actuators (5), and
    thereafter, for each active electromechanical actuator (5), performing the steps of:
        determining with a current sensor (18) a current value (Ivr) representative of the power supply current of the electromechanical actuator;
        determining by the braking controller (9) a reference current value (Ir) estimated from the power supply currents of at least two other electromechanical actuator (5);
        comparing by the braking controller (9) the representative current value (Ivr) and the reference current value (Ir);
        detecting by the braking controller (9) an abnormal operation of the electromechanical actuator (5) when the difference between the representative current value and the reference current value is above a predetermined threshold (Is), and
    following the detection of an abnormal operation of an electromechanical actuator (5), the steps of:
        identifying by the braking controller (9) the electromechanical actuator (5) exhibiting the abnormal operation;
        signalling by the braking controller (9) abnormal operation of the electromechanical actuator (5);
        performing by the braking controller (9) a restoration or deactivation of the abnormal electromechanical actuator (5).

2. The method according to claim 1, in which the representative current value (Ivr) is an absolute value of an estimation of the power supply current of the electromechanical actuator (5).

3. The method according to claim 1, in which the reference current value (Ir) is an average of absolute values of estimations of the power supply currents concerned.

4. The method according to claim 2, in which the estimations of the power supply currents are average values or instantaneous values of the power supply currents.

5. The method according to claim 1, in which the representative current value (Ivr) and the reference current value (Ir) are obtained from power supply currents measured during off-load operating phases of the electromechanical actuators.

6. The method according to claim 1,
    wherein the restoration action comprises performing a corrective or reconfiguration action to try to restore the electromechanical actuator to normal operating conditions; and
    wherein the deactivation action comprises deactivating the electromechanical actuator exhibiting an abnormal operation if the corrective or reconfiguration action does not make it possible to restore the electromechanical actuator to the normal operating conditions.

7. The method according to claim 3, in which the estimations of the power supply currents are average values or instantaneous values of the power supply currents.

* * * * *